Feb. 25, 1964     A. W. BROWN ETAL     3,122,130
AUTOMATIC SUCKLING PIG FEEDER
Filed June 26, 1961     3 Sheets-Sheet 1
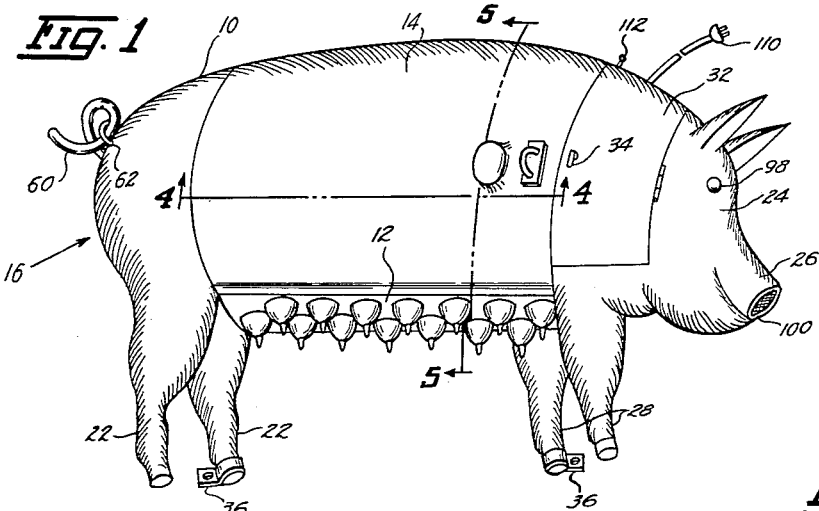
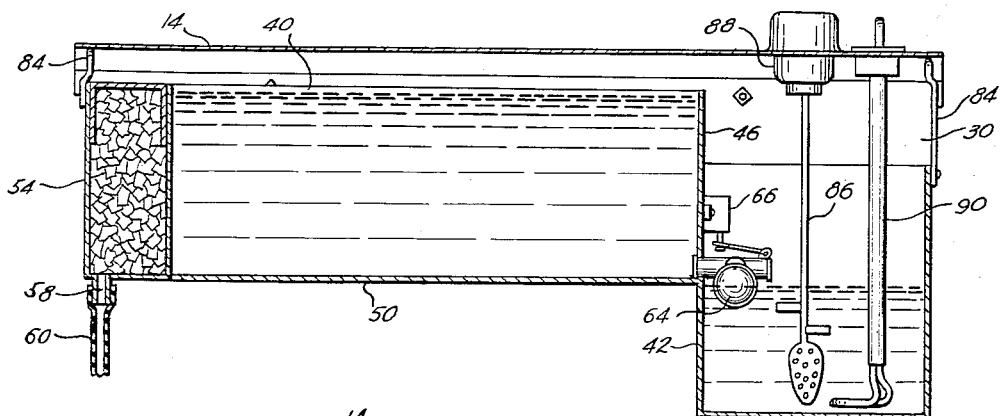
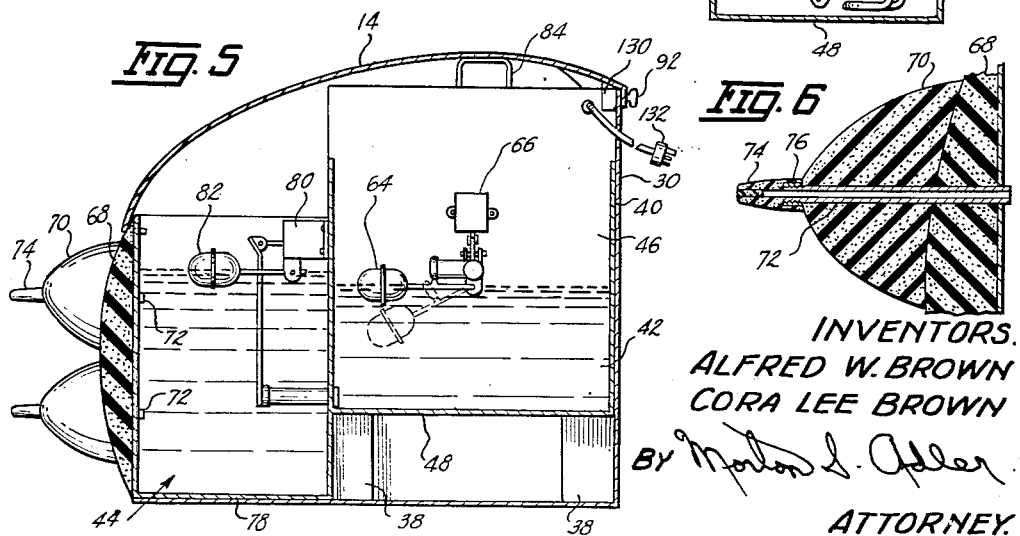
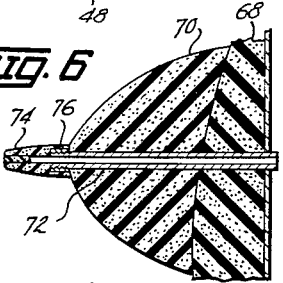
INVENTORS.
ALFRED W. BROWN
CORA LEE BROWN
BY Morton S. Adler
ATTORNEY.

Feb. 25, 1964　　A. W. BROWN ETAL　　3,122,130
AUTOMATIC SUCKLING PIG FEEDER
Filed June 26, 1961　　3 Sheets-Sheet 2
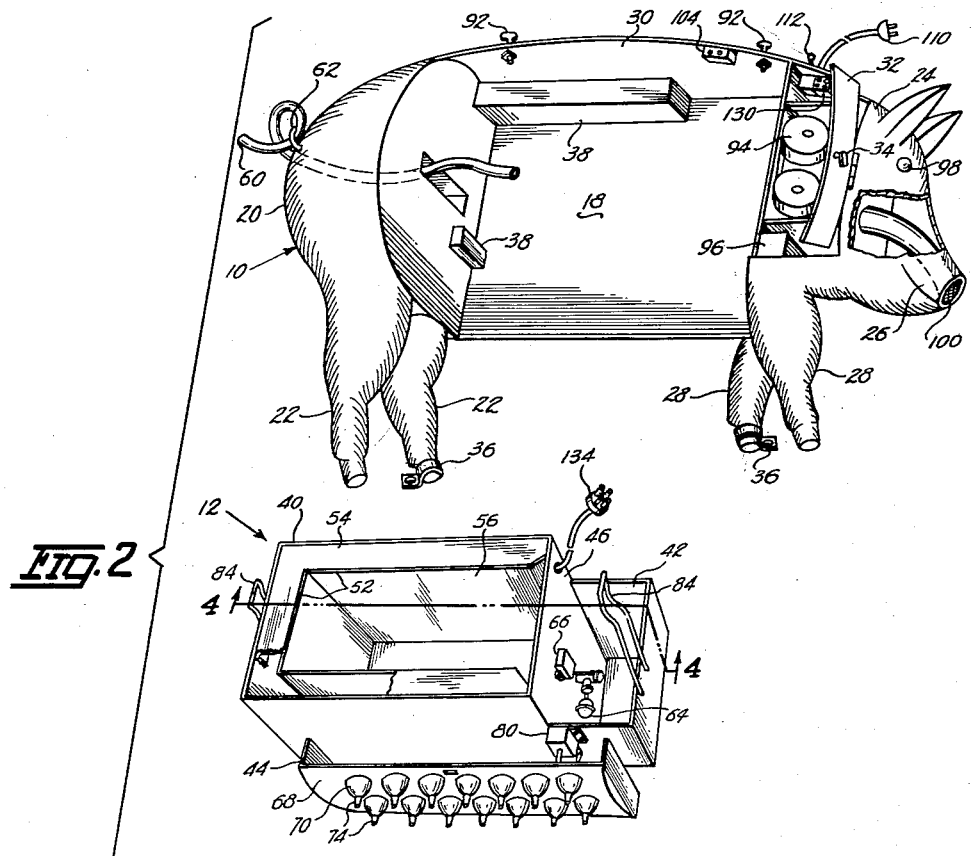
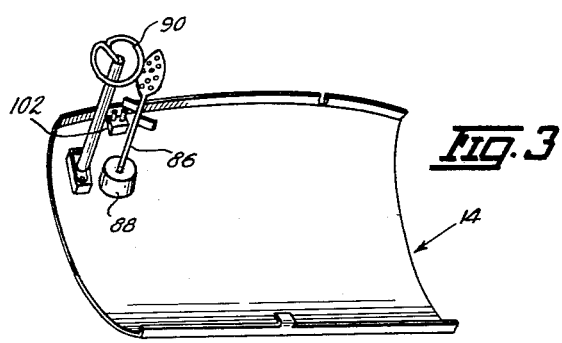
INVENTORS.
ALFRED W. BROWN
CORA LEE BROWN
BY Morton S. Adler
ATTORNEY.

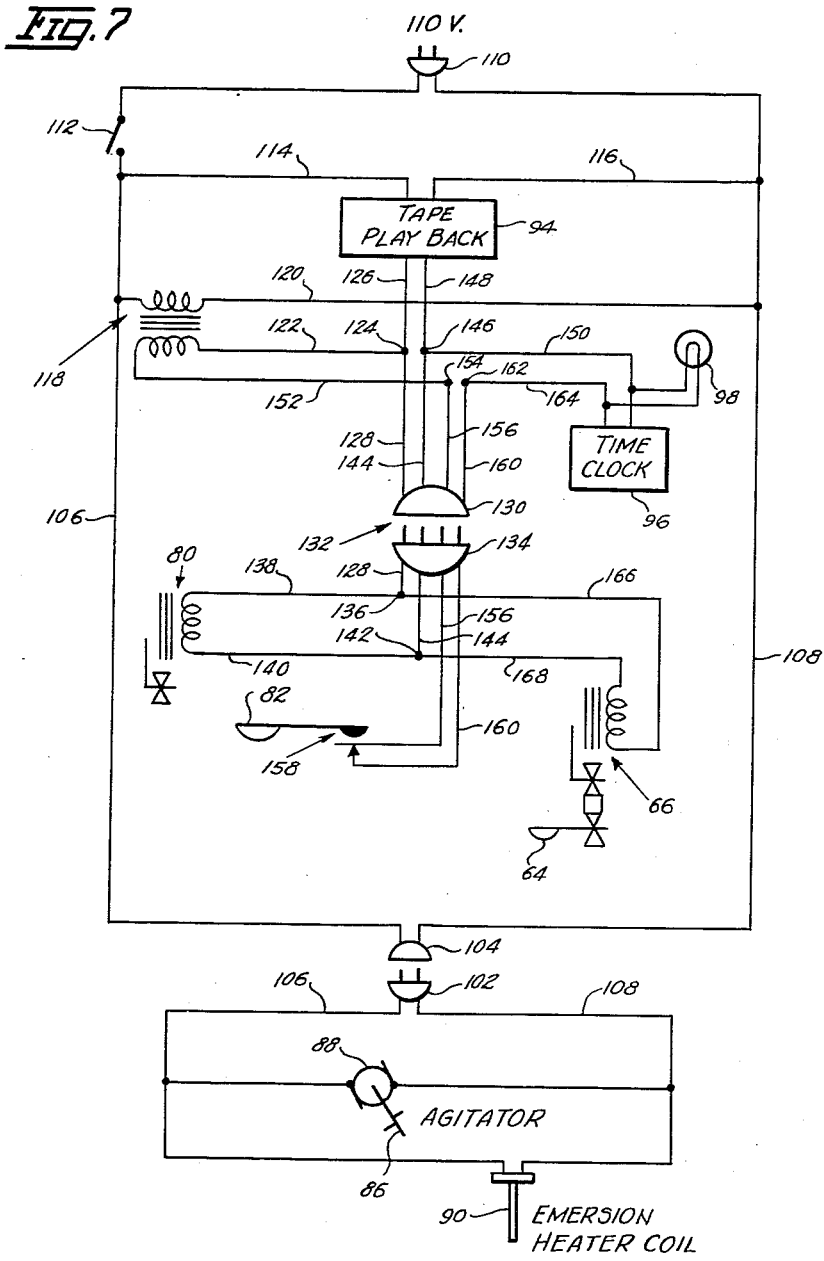

3,122,130
AUTOMATIC SUCKLING PIG FEEDER
Alfred W. Brown and Cora Lee Brown, Ankeny, Iowa
Filed June 26, 1961, Ser. No. 119,627
4 Claims. (Cl. 119—71)

This invention relates to improvements in pig feeders and more particularly to a novel and improved apparatus of this type which we refer to as an artificial sow because of its special utility in feeding newborn pigs.

One of the important objects of this invention is the provision of a pig feeder designed in the form and size of an actual sow so as to simulate as much as possible the nursing environment afforded by the real animal and to thereby create a natural atmosphere for cultivating the natural eating habits and conditions of the newborn pigs.

Another object inhering herein is the provision of a pig feeder of the above class which includes a removable tank assembly having a plurality of feed tanks of which one contains a supply of fresh fluid feed with means to keep such supply cool, or insulated against freezing, as the outside temperature may require; one of which is utilized to maintain a limited feed supply at a temperature corresponding to that of a live sow, and one of which is a feeding tank from which pigs can feed from nipples or teats of the same shape and size as on a real sow.

A further object is to provide such tanks as indicated so that communication between the respective tanks as required is accomplished by gravity flow when permitted by the actuation of certain electrically controlled valved means according to predetermined time intervals.

Still another important object of this invention is the utilization of a sound recording of the actual sounds emitted by a sow at feeding time which operates on predetermined time schedules and is synchronized with the regulated supply of feed to the feeding tank.

Other objects are to provide a feeder of the above class that is light weight but of sturdy construction to withstand the roughness of small pigs, attractive and life like in appearance, easy to clean, and extremely efficient for its intended purpose.

Further objects and the more obvious advantages of the invention will be mentioned or else appear plainly from the description which follows.

This invention consists of novel parts and combination of parts to be hereinafter described whereby the objects set forth are attained, as pointed out in the claims, and illustrated in the accompanying drawings, in which:

FIG. 1 is a top view showing a preferred embodiment of this invention,

FIG. 2 is an exploded view of this invention with parts broken away and parts shown in section to more clearly illustrate the several component sections thereof, FIG. 3 is a bottom view of the cover section, FIG. 4 is an enlarged cross sectional view taken on the line 4—4 of FIG. 1, FIG. 5 is an enlarged cross sectional view taken on the line 5—5 of FIG. 1, FIG. 6 is an enlarged sectional view of one of the teats on the feeder section, and FIG. 7 is a wiring diagram of the circuitry used with this invention.

Referring to the drawings this invention includes three main sections as shown in FIG. 2, namely the base or body section 10, the tank section or assembly 12 and the cover or lid section 14. When sections 10, 12, and 14 are assembled into the complete unit as seen in FIG. 1 which is designated generally by the numeral 16, it will be seen that the appearance of a sow is readily simulated. Such assembled unit 16 is so arranged that in feeding position, the simulated animal is lying on its side in the natural position of a nursing sow.

Preferably unit 16 is in the actual size of a brood sow being approximately four and one-half feet in length and two and one-half feet in width but such dimensions are not critical and may be varied.

It is desirable that the material used be light in weight so that one person can easily handle or move unit 16 and for this purpose we recommend plastic or a suitable light metal which will also be durable enough to withstand the roughness of tiny pigs up to seven or eight weeks of age. It is further recommended that the exterior of unit 16 be smooth and attractive and preferably painted to accurately simulate color markings on a recognized breed of hogs.

The base or body section 10 is in effect a light shell being open in the center portion as at 18, having a substantially hollow rear portion defining the rump 20 and hind legs 22 and a front hollow portion defining the head 24, snout 26 and front legs 28 of the simulated or artificial sow. A support 30 defining the upper back of the simulated sow connects the rear and front sections as shown in FIG. 2. Access to the interior of the head 24 is by means of a hinged door 32 having the knob 34. Body 10 may be secured to a floor by clips 36 attached to one of the rear and front feet 22 and 28 and also preferably to support 30.

The tank assembly 12 is mounted within opening 18 and rests on supports 38. Such assembly 12 includes a fresh storage tank 40, a mixing and warming or ready tank 42, as we call it, and a feeding or udder tank 44. Tank 42 is at one end of tank 40 and has the common tank side 46 therewith. However, it will be noted that the bottom 48 of tank 42 is on a lower level than the bottom 50 of tank 40. Within the fresh storage tank 40 there is the insulated partition 52 providing an outer compartment 54 and an inner compartment 56, such compartment 54 being relatively narrow and extending on three sides of compartment 56 as shown. Compartment 56 is designed to hold a supply of fresh fluid feed of approximately five gallons and in warm weather the freshness of such supply can be maintained by keeping cold water or ice, for example, in compartment 54. In cold temperatures, warm water or a suitable insulation material can be applied to compartment 54.

The bottom of compartment 54 is provided with a drain outlet 58 (FIG. 4) to which is attached a flexible hose 60 that serves as the tail of unit 16. Normally the tail is curled in a normal manner and held in place on the rump 20 by a staple 62 and thus by loosening the tail and allowing it to drop, compartment 54 can be easily drained when it is necessary or desired.

Flow communication between tanks 40 and 42 is provided by a double valve means of which one is a usual float valve 64 and the other is a solenoid actuated valve 66, both being in the same flow line. Details of these valve operations and other valves to be mentioned will be given later in relation to the circuitry in FIG. 7. Tank 42 is considerably smaller than tank 40, being designed to hold approximately one and one-half gallons of feed or in general an amount substantially consumed by the pigs at a single feeding. Feed in this tank is continuously agitated and warmed as will be referred to in more detail relative to the description of cover 14.

Tank 44 is the feeding or udder tank and forms the underbelly of the unit 16. It is secured across the outside of tanks 40 and 42 (FIG. 2), has a padded but durable soft washable portion 68 of rubber or the like to simulate a sow's belly and is provided with a plurality (preferably fourteen) teats 70 through which feeding tubes 72 connect to pencil like nipples 74 which are threadably attached as at 76 for easy removal and cleaning. The inner ends of tubes 72 communicate with the interior of tank 44, and such tank is relatively thin so that a small amount of feed or milk will rise quickly over the level of tubes 72. The bottom 78 of tank 44 is lower than the bottom 48 of tank 42 (FIG. 5) and flow connection between such tanks is by the microswitch operated valve 80. A float valve 82 in tank 44 affects the operation of valve 80 as will later appear.

The tank assembly 12 is provided with suitable handles 84 for ease in handling, and with assembly 12 in place, cover 14 encloses the same as shown in FIGS. 1 and 5. The cover 14 includes a geared down spoon-like agitator 86 operated by motor 88 and a thermostatically operable emersion heater coil 90 both of which are so positioned as to be disposed within tank 42 when such cover is in place. Set screws 92 provide means for securing cover 14 to support 30.

In the head portion 24 (FIG. 2) we have placed a closed circuit tape playback device 94 having an actual recording of the sounds emitted by a sow in the nursing of its young. Included also in head 24 is a time clock 96, a red electric light 98 which serves as the eye of the sow, and a speaker 100 for recorder 94 disposed in the snout 26. Thus, with this feeder constructed as described, and with reference now to the wiring shown in FIG. 7, the operation of this invention is as follows.

The desired formula is supplied to compartment 56 and heat or cold as may be desired is provided in compartment 54 as described. Initially before any electric current is supplied, the solenoid valve 66 is normally open so that formula can flow from tank 40 into tank 42 by gravity since float valve 64 will also be open but will close the flow when the level in tank 42 reaches the proper level. The microswitch valve 80 between tanks 42 and 44 is normally closed. With tank 40 supplied, cover 14 is secured in position whereby the contact plug 102 in the cover engages plug 104 in support 30. Plug 104 connects by leads 106 and 108 to plug 110 above head 24 that will attach to a source of 110 v. power. Thus the motor 88 and heating element 90 are connected directly to the 110 v. line and will operate as long as plugs 102 and 104 are connected. A master switch 112 at the upper forward portion of unit 16 is imposed in lead 106.

The delivery of formula from tank 42 to 44 and the operation of the playback device 94, light 98, and valves 66 and 80 are triggered by the timeclock 96. Clock 96 may be set for predetermined intervals and we have preferably used a thirty minute cycle of operation. As seen in FIG. 7, the playback 94 is connected across leads 106 and 108 by leads 114 and 116. A transformer 118 is used to reduce the voltage to members 66, 80, 96 and 98 and the primary of the transformer is connected across leads 106 and 108 by lead 120. Lead 122 connects one side of the secondary of transformer 118 to terminal 124 from which lead 126 runs to the playback device 94 and lead 128 runs to one side 130 of plug 132 and from the other side 134 of such plug to terminal 136. One side of member 80 connects by lead 138 to terminal 136 and the other side connects by lead 140 to terminal 142. Lead 144 runs from terminal 142 through plug 132 to terminal 146 which is connected by lead 148 to playback 94 and by lead 150 to the timeclock 96.

The other side of the secondary of transformer 118 connects by lead 152 to terminal 154 which is connected through plug 132 by lead 156 to one side of the normally closed switch 158. The other side of such switch connects by lead 160 through plug 132 to terminal 162 from which the circuit to clock 96 is completed by lead 164. Light 98 is connected across leads 150 and 164. One side of the electrically operated valve 66 connects by lead 166 to terminal 136 and the other side connects to terminal 142 by lead 168.

With the wiring arranged as described, clock 96 acts at predetermined intervals to close the circuit to leads 150 and 164 with the following results. Light 98 goes on and playback 94 is started; valve 80 which is normally closed is opened to permit the warmed stirred formula to drain by gravity from tank 42 into tank 44 and at the same time the normally open valve 66 is closed so as to prevent cool formula in compartment 56 of tank 40 from flowing into tank 42 and reducing the temperature of the formula flowing into tank 44. As tank 42 empties, float valve 66 will, of course, drop to open position. In tank 44, the float valve 82 acts to open switch 158 when the fluid level in tank 44 reaches the determined level and this opens the circuit to clock 96 to deactuate valve 80 which closes communication between tanks 42 and 44 and deactuates valve 66 which returns to open position permitting flow from tank 40 to tank 44 until shut off by the float valve 64. Opening of switch 158 also opens the circuit to light 98 and playback 94 and the operation just described is repeated at regular intervals in response to the actuation by clock 96.

This invention has demonstrated its effectiveness in actual field tests particularly in greatly reducing the mortality rate of newly born pigs. Farrowing time is the most dangerous for baby pigs who instinctly hover close to the sow and close to each other in their search for food and togetherness and because of this fact are frequently crushed to death or fatally injured by the movements of the sow. There are, of course, farrowing stalls to separate the pigs from the sow and keep them from being trampled, but these are often inadequate since the little pigs often stumble blindly into the sow's compartment. With out artificial sow, the pigs are afforded a natural environment for nursing and cuddling and many pigs can be saved by utilizing this invention at least for part of the litter and thus leaving only two or three pigs with the natural sow to draw her milk and keep her motherly instincts alive. Proper care immediately to the newborn pigs is vitally important since it is the first few days of life where danger of losing them is so great, and in this respect, our invention is most satisfactory.

In some instances a sow will die after farrowing a large litter and this places the farmer in a precarious position in regard to saving the litter. Even another sow farrowing at the same time may not take a litter from another and even if she would, she probably has too few teats to handle them all. Also trying to place pigs a day or two younger than pigs with another sow can result in the older ones, though small, fighting with the younger pigs until some or all are dead.

This artificial sow is thus aptly suited for use in rearing baby pigs or in finishing the rearing of little pigs when the sow's supply of milk has started to decrease. It is thus possible by using this invention to let a sow rest and exercise in the barnyard during the time that she would normally be around nursing her litter and thereby being more quickly conditioned for further breeding or for marketing if desired.

Many sows have an insufficient number of teats for their own litter and some farrow only two or three pigs. In the former case, this invention can handle the surplus and in the latter situation it can be used altogether so as to eliminate the necessity of keeping a sow in the farrowing house for a long period of time just to nurse two or three pigs.

The playback 94 is most effective in adding to the simulation of the feeding environment as the little pigs instinctively associate such sounds with the presence of food. The illuminated light 98 and even the cyclic sounds of switch operations become known to the pigs since they react promptly to such stimuli in suckling from the nipples 74. Light 98 also serves as a visual indicator to the farmer that the artificial sow is in operation.

It is submitted that the invention shown and described is aptly suited to achieve the purposes intended and is characterized by a combination of highly useful and mutually cooperating elements that combine their respective and proportionate functions in accomplishing the objects sought to be obtained.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claims, any modified forms of structure or mechanical equivalents which may be reasonably included within their scope.

We claim:

1. In a pig feeder, a base, a tank assembly removably supported by said base, said tank assembly being a unitary structure including a first, second and third tank member, valved flow communication means between said first and second tank members and between said second and third tank members, said first tank member adapted to hold a supply of fresh fluid feed formula for use over an extended time interval, said second and third tank members adapted to hold a supply of such formula sufficient for a single feeding interval, a cover for said tank assembly, agitator means and a thermostatic heating element attached to said cover and operable within said second tank member when said cover is in place, a plurality of nipples protruding from said third tank member and communicating with the interior thereof, a tape playback device in said base, said playback having a recording of the actual sounds emitted by a nursing sow in relation to the nursing process, a timing means operatively connected to said valved flow communication means and said playback device for effecting flow communication between said tank members and operation of said playback device at predetermined intervals, said valved flow communication means being interconnected to effect closing of flow communication between said first and second tank members when flow communication between said second and third tank members is open and vice versa, and said valved flow communication means between said second and third tank members being connected to said playback device for deactuating the same when flow communication between said second and third tank members is closed.

2. In a pig feeder, a base, a tank assembly removably supported by said base, said tank assembly being a unitary structure including a first, second and third tank member, a gravity flow line connecting said first and second tank members, a gravity flow port connecting said second and third tank members, a first float valve in said second tank member connected to said flow line, a solenoid actuated normally open valve in said flow line, a normally closed microswitch valve in said flow port, a second float valve in said third tank member, an electric circuit including said solenoid actuated valve, said microswitch valve and also including a timing device and tape playback device in said base, said playback device having a recording of the actual sounds emitted by a sow in the nursing process, said timing device designed to act at predetermined intervals to open said microswitch valve and permit flow communication between said second and third tank members and at the same time to close said solenoid valve to close communication between said first and second tank member and also at the same time to actuate said playback device, said second float valve being responsive to fluid level in said third tank member and arranged to open the circuit to said timing device and said playback device at a predetermined fluid level in said third tank, the opening of the circuit to said timing device effecting the closing of said microswitch valve and the opening of said solenoid valve whereby flow communication between said first and second tank members is established until stopped by said first float valve, and said third tank member having a plurality of nipples protruding therefrom and communicating with the interior thereof.

3. A device as defined in claim 2 including means in said first tank member for selectively receiving a cooling or warming means to insulate the contents of said first tank member against excessive heat or cold as the outside temperature may require.

4. A device as defined in claim 2 including a cover for said tank assembly, electrically operable agitator means attached to said cover, electrically operable thermostatically controlled heating element attached to said cover, said agitator and heating element electrically connected in said circuit, and said agitator and heating element disposed to operate within said second tank member when said cover is in place.

References Cited in the file of this patent

UNITED STATES PATENTS

| | | |
|---|---|---|
| 965,602 | Runner | July 26, 1910 |
| 1,177,908 | Teeters | Apr. 4, 1916 |
| 2,263,069 | Coyner | Nov. 18, 1941 |
| 2,794,576 | Reynolds | June 4, 1957 |
| 2,859,731 | Sutton | Nov. 11, 1958 |
| 3,037,481 | Kloss | June 5, 1962 |

FOREIGN PATENTS

| | | |
|---|---|---|
| 510,370 | France | Dec. 3, 1920 |
| 109,383 | Germany | Mar. 23, 1900 |